United States Patent [19]

Vig

[11] Patent Number: 4,602,899
[45] Date of Patent: Jul. 29, 1986

[54] ADJUSTABLE MACHINE-REAMER

[75] Inventor: Istvan Vig, Olten, Switzerland

[73] Assignee: Dihart AG, Dulliken, Switzerland

[21] Appl. No.: 563,996

[22] Filed: Dec. 21, 1983

[30] Foreign Application Priority Data

Jan. 3, 1983 [CH] Switzerland .............................. 19/83

[51] Int. Cl.⁴ ............................................ B23B 51/00
[52] U.S. Cl. .................... 408/153; 408/154;
408/158; 408/168; 408/199; 407/45; 407/86
[58] Field of Search ....................... 407/44, 45, 48, 77,
407/86, 87, 73, 85, 103, 104; 408/158, 161, 168,
169, 154, 200, 713, 714, 147, 153, 162, 170, 186,
199, 197

[56] References Cited

U.S. PATENT DOCUMENTS

| | | | |
|---|---|---|---|
| 2,598,581 | 5/1952 | McKenna et al. | 407/104 |
| 3,371,397 | 3/1968 | Coleshill et al. | 407/48 |
| 3,376,763 | 4/1968 | Welles | 408/713 |
| 3,611,527 | 9/1971 | Hudson | 408/153 |
| 3,848,303 | 11/1974 | Faber | 407/77 |
| 4,072,438 | 2/1978 | Powers | 408/199 |
| 4,083,645 | 4/1978 | Friedline | 407/104 |

FOREIGN PATENT DOCUMENTS

| | | | |
|---|---|---|---|
| 2854149 | 7/1980 | Fed. Rep. of Germany | 407/87 |
| 2359672 | 3/1978 | France | 408/161 |

Primary Examiner—Eugene F. Desmond
Assistant Examiner—Daniel W. Howell
Attorney, Agent, or Firm—William J. Daniel

[57] ABSTRACT

In the known, adjustable, single-cutting-edge machine reamers having a turnable cutting plate, the adjusting and re-adjusting operations are awkward and associated with difficulties because, at least as far as adjusting is concerned, adjustments have to be made at two points, and moreover for adjusting to the set desired value it is generally necessary to proceed in a step-by-step manner, gradually working ones way up to the desired value. These problems are due to the fact that adjustment can in principle only be made in the forward direction, that is to say in the direction of increasing diameter, whereas reverse adjustment in the proper meaning of the term is not possible but can only be achieved indirectly by carrying out a new adjustment with a lower starting value and adjusting in a forward direction. These problems and other disadvantages of these reamers are eliminated by a new overall concept employing a turnable cutting plate (3) in the form of an equilateral polygon, said turnable cutting plate being adjustable by means of an adjustable stop and an fixed stop (15, 14) on the polygon-sides (45, 44) of the turnable cutting plate inclined toward each other and a securing screw (17) for the turnable cutting plate acting as a springy restoring element and hence also enabling reverse adjustment to be effected.

17 Claims, 13 Drawing Figures

ADJUSTABLE MACHINE-REAMER

The invention concerns an adjustable machine reamer comprising a tool shank and a reamer head with a single cutting edge, a turnable cutting plate carrying the cutting edge, and fastening means for pressing said turnable cutting plate against a supporting surface provided on the reamer head, adjusting means for varying the setting of the distance between the cutting edge and the axis of the reamer, and several guides on the reamer head for guiding the cutting edge in a circular orbit as well as for supporting the unilateral cutting forces. Machine reamers of this kind have been known for some time now, e.g. through DE-OS No. 15 02 869 as well as various brochures put out by Mapal Fabrik für Präzisionswerkzeuge Dr. Kress KG, Aalen and also from "Bossard Mitteilungen" No. 522, p. 2, of October 1982, published by Bossard Schrauben AG, Zug (Switzerland). In these reamers the turnable cutting plate has an elongated, essentially rectangular shape with the cutting edge on one and a spare cutting edge on the other of the two long sides of the rectangle, and the fastening means consist essentially of a clamping claw which presses against the plate-side of the turnable cutting plate facing away from said supporting surface and a threaded borehole in the reamer head for tightening the clamping claw. In these reamers adjusting means for varying the setting of the radial distance between the cutting edge and the axis of the reamer are provided in the form of two threaded boreholes in the reamer head threaded pins which, when tightened, either directly or via intermediate pressure pieces press upon the rectangle-side of the cutting plate and in so doing move the cutting plate in a radial direction. However, the type of adjustment has considerable drawbacks in practical use. First it is quite obviously much less advantageous if, in order to adjust or readjust a reamer, adjustments to obtain a correct positioning of the cutting edge must be undertaken at two points rather than at only one point. In certain circumstances where correct positioning of the cutting edge is not of vital importance, these known reamers can, certainly, be readjusted not by means of only the one pin adjacent the front end of the turnable cutting plate where the main cutting section is located, but every subsequent re-adjustment then naturally alters the conicity of the secondary blade, the overall alteration of this conicity becoming more pronounced from one re-adjustment to another. In such known reamers, therefore, single-point adjustment is only possible when making re-adjustments, and even then only if the change in cutting edge geometry extending beyond the adjusting range can be tolerated, whilst when carrying out the new adjustment required when inserting a new turnable cutting plate or when turning it to a new cutting edge adjustments must in any event be undertaken at both points. Furthermore, in known reamers this adjustment is relatively awkward to execute for two reasons. First, the clamping claw cannot be fully tightened because the cutting plate must be able to move during adjustment; on the other hand, however, neither must the clamping claw be so loose as to allow the turnable cutting plate to be easily moved, e.g. by hand, because after adjustment at one of the two adjusting points the turnable cutting plate has to be held in position by the clamping claw while the adjustment is carried out at the other adjusting point. There are, therefore, certain difficulties involved in finding the correct amount of tightening required for the clamping claw in each case, particularly where the clamping screw acts directly on the clamping claw and not via an intermediate springy element and hence only slight loosening of the clamping screw usually leads to the clamping claw's lifting off. This somewhat awkward procedure for tightening of the clamping claw would not in itself be so important if it only had to be done once each time the turnable cutting plate is inserted or turned. However, finding the correct adjustment immediately is at least rare—with the possible exception of highly experienced operating personnel—the rule must surely be that of slowly working ones way step-by-step, and that is, of course, relatively awkward. Thus, this trial and error approach cannot be avoided because, in the event—whether because of taking excessive steps while working ones way or because an attempt to obtain the correct adjustment straight off fails—one has set too large a diameter the clamping claw has to be released again, reset and then the entire adjustment repeated, since, as already mentioned, the clamping claw must remain tightened to such an extent during the adjusting process that the turnable cutting plate cannot be moved by hand. Thus it is not possible, once an over-large diameter has been set, merely to push the turnable cutting plate back by hand after resetting the relevant threaded pin accordingly. In such a case one can, of course, move the turnable cutting plate back by, e.g., tapping the edge of the turnable cutting plate lying behind the cutting edge lightly with a small copper hammer, and something like this probably is in fact practiced in order to avoid having to repeat the entire adjustment process again after an excessive diameter has been set. This solution is of course accompanied by the risk of damaging the cutting edge if the blow is not applied exactly as it should be and thus is basically only an emergency solution, to be avoided whenever possible, with the result that the only remaining, acceptable option is the above awkward method of working ones way step by step toward the correct adjustment. In addition to its awkwardness, this step-by-step approach is also accompanied by the risk that a slight deviation from the precisely correct adjustment will be permitted in order to avoid repeating the adjustment procedure again so that part of the tolerance range is used up. The same risk obviously also arises on the occasion of subsequent re-adjustments, for, even if working ones way to the desired adjustment is as a general rule eliminated in the case of re-adjustment because the operating personnel have at least a rough idea of the magnitude of the wear on the reamer and of the magnitude of the reduction of the diameter of the reamer during the reamer operational period until the next re-adjustment, and by what angle of rotation the threaded pins have to be adjusted in order to make up for this reduction in diameter, operating personnel will, to avoid exceeding tolerances if the setting was not made to exactly the desired values in the first place, re-adjust by a lesser amount than would otherwise be the case, and this then leads to a gradual drop in the mean value of the diamater of the reamer before and after re-adjustment from the upper toward the lower tolerance limit. Moreover, with such a smaller re-adjustment amount the operational period between any two successive re-adjustments is naturally also smaller, with the result that the question then quickly arises as to whether time-consuming measurements during the course of re-adjustments are not after all more advantageous than putting up with short operational periods between successive re-adjustments. It can therefore be seen that, as regards adjusting and re-adjusting, the design of the adjusting means in said known reamers is associated with a whole series of partly intermeshing and mutually interdependent problems which are essentially all due to the fact that in principle an adjustment can only be undertaken in the forward direction, i.e. the direction of increasing diameter, whereas adjustment in the rearward direction is not in any real sense possible but can only be achieved indirectly by means of a new adjustment to a lower initial value and adjustment in the forward direction.

A further practical drawback with these known reamers arises from the peripheral spacing, e.g., of about 90°, between the axis of the clamping screw and the axes of the two threaded pins which requires that the reamer be rotated back and forth while remaining clamped in the machine in order to achieve the adjustment.

According to the invention, desirable simplification is achieved in an adjustable machine reamer of the kind in question in that the turnable cutting plate has essentially the form of an equilateral polygon with the cutting edge on one side of the polygon and spare cutting edges on the remaining sides of the polygon, the fastening means comprising a first fixed stop or abutment for a first one of the polygon-sides of the turnable cutting plate carrying the spare cutting edges, and a second adjustable stop or abutment for a second one of the polygon-sides at the turnable cutting plate carrying the spare cutting edges, said second side being inclined relative to said first side, and a screw connection serves for pressing the turnable cutting plate against both the supporting surface and the two stops and an opening in the turnable cutting plate widening over at least a part of its total length towards the face of the turnable cutting plate facing away from the supporting surface of the turnable cutting plate, said opening lying in the center of the turnable cutting plate at the intersection of the bisecting lines of the internal angles of the polygon, a pressure part fitting into the widening part of the opening and being movable into said widening part of the opening during tightening of said screw connection and resting unilaterally against the widening part of said opening with the screw connection tightened, a pin being connected with the pressure part and the part of the reamer head carrying the supporting surface and being provided over at least part of its length with a thread, and a borehole at least partly accommodating the pin and being in the part of the reamer head carrying the supporting surface, said borehole being, for the purpose of said unilateral resting of the pressure part against the widening part of the opening with the screw connection tightened, arranged offset to the opening in such a manner that the distance between the cutting edge and the point of intersection of the extended axis of the borehole with the plane of the face of the turnable cutting plate facing away from the supporting surface is greater than the distance between the cutting edge and the point of intersection of the extended axis of the pin with the plane of the plate-side of the turnable cutting plate facing away from the supporting surface so that the deflection of the pin resulting therefrom generates a springy force pressing said first polygon-side of the turnable cutting plate against the fixed stop and said second polygon-side of the turnable cutting plate against the adjustable stop at least above the lower limit of the setting range of the reamer, thus exerting a restoring force on the adjustable stop within the setting range of the reamer. The adjusting means comprise the adjustable stop and means for the adjustment thereof in a direction essentially parallel to the plane of the supporting surface and inclined towards said second polygon-side of the turnable cutting plate and in the opposite direction as well as for the essentially compression-proof support of the adjustable stop at at least one support element connected in one piece with the part of the reamer head carrying the supporting surface, adjustability of the adjustable stop in the direction causing an increase in the distance of the cutting edge from the axis of the reamer being restricted in such a manner that said deflection of the pin at the upper limit of the adjustment range of the reamer still lies within the elastic deflection range of the pin.

The present, adjustable machine reamer has a whole series of advantages, the most important of which is that a restoring force is exerted by said springy force on the adjustable stop serving to adjust and re-adjust the reamer, permitting a movement in the forward and backward directions during the adjustment and re-adjustment of the reamer, and in consequence thereof virtually all the problems of adjustment described earlier are eliminated. A further, highly significant advantage of the present reamer is that adjustment of the reamer is effected by means of a single adjusting element, i.e., for example, by means of a single set screw, resulting in additional savings in time. Further savings in time are made possible due to the fact that the back and forth rotation of the reamer holder is no longer necessary. All in all, the present reamer results in a highly significant simplification and shortening of the adjusting and re-adjusting process. Further advantages of the present reamer are the increase in the number of the spare cutting edges available, the reduction in the number of the component parts, and particularly also the very simple and hence economical structural design of the reamer, particularly as regards the basic body of the reamer.

In a preferred embodiment of the present reamer the turnable cutting plate has essentially the form of an equilateral triangle and the two stops rest against the two triangle-sides of the turnable cutting plate carrying the spare cutting edges. This embodiment is particularly suitable for relatively small reamer diameters, and, enables the blind boreholes to be reamed right down to the bottom of the hole. In addition, this embodiment permits the adjusting means to be located relatively centrally, which in certain circumstances is of considerable importance in the case of smaller reamer diameters.

Further advantageous embodiments of the present reamer are obtained using square, pentagonal, hexagonal and octagonal turnable cutting plates; here, the additional advantages reside first and foremost in the greater number of spare cutting edges, though these embodiments are less suitable for reaming blind holes, being mainly applicable for through-holes.

In the present reamer, both the cutting edge and the spare cutting edges preferably lie on the face of the turnable cutting plate facing away from the supporting surface. This has the advantage that triangular, square, pentagonal, hexagonal and octagonal turnable cutting plates of this shape are commercially available articles associated with correspondingly low costs and with which a relatively small amount of material needs to be removed, even when grinding them to shape. so that even the grinding-to-shape costs are relatively low. Furthermore, there is also the advantage, here, of simple manipulations when changing cutting edges, since in so doing the turnable cutting plate needs only to be rotated but not turned round.

Such a design for the turnable cutting plate is furthermore of advantage in that the fastening opening in the turnable cutting plate is conical in its widening part and cylindrical in the remaining part or parts and that the axes of the conical and cylindrical parts of the opening coincide and extend through the said center of the turnable cutting plate and that the planes of the two plate-sides of the turnable cutting plate intersect perpendicularly. This is of advantage because the said commercially available turnable cutting edges can be procured with such an opening and hence entail less expense than turnable cutting plates with specially shaped openings. The said pressure part should in this case also have a conical form of at least approximately the same conicity as that of the widening part of the opening or a spherical form matching the conical part of said opening.

In order to be able to arrange the turnable cutting plate as far forward on the reamer head as possible, which is of importance, among other things, for the said reaming down to the bottom of blind boreholes it is of advantage if the said first polygon-side and hence also the fixed stop engaged thereby lies closer to the head end of the reamer head than the said second polygon-side and the adjustable stop because the adjusting means as a rule require considerably more space than a fixed stop.

A further, very advantageous embodiment of the present reamer is characterized in that the turnable cutting plate has essentially a rhombic form and that both the cutting edge and the spare cutting edge provided on the rhombus-side of the turnable cutting plate being parallel to the cutting edge lie on the plate-side of the turnable cutting plate facing away from the supporting surface and the other two spare cutting edges of the turnable cutting plate lie on the plate-side of the turnable cutting plate facing toward the supporting surface, that furthermore the opening in the turnable cutting plate comprises, in addition to said part widening toward the plate-side of the turnable cutting plate facing away from the supporting surface, a further part widening toward the plate-side of the turnable cutting plate facing toward the supporting surface, and that the adjustable stop rests against the rhombus-side of the turnable cutting plate being parallel to the cutting edge and that the fixed stop rests against one of the two other rhombus-sides of the turnable cutting plate carrying spare cutting edges, preferably against that rhombus-side lying closer to the head end of the reamer head. Advantageously, here, the opening in the turnable cutting plate is conical in both its widening parts and the conicity of said two widening parts is identical and the axes of said two widening parts coincide and extend through the said center of the turnable cutting plate and intersect the planes of the two plate-sides of the turnable cutting plate perpendicularly, the said pressure part having a conical form of at least approximately the same conicity as that of the two widening parts of the opening or a spherical form matching said two conical parts of the opening. The major advantage of this embodiment is that, in the presence of a cutting edge extending to the head end of the reamer, it permits three spare cutting edges.

In the present reamer, the pressure part and the pin can be formed to particular advantage by a screw, at the head of which the pressure part is provided and the shank of which forms the pin, the afore-mentioned borehole being a threaded borehole into which the screw is screwed. The advantage of this arrangement resides in the small number of component parts. Here, the part of the pin formed by the shank of the screw can advantageously be so dimensioned that said threaded part of the screw is, with the screw connection tightened, completely accommodated within the threaded borehole. The remaining, non-threaded part of the screw shank should advantageously have, over at least a part of the total length of said remaining part adjoining the thread, a diameter being smaller than or at the most equal to the external diameter of the thread reduced by twice the depth of the thread.

Instead of combining the pressure part and the pin in a screw and forming the borehole as a threaded borehole, it may, however, in certain circumstances, e.g. when the length available for the borehole is only relatively small and for strength reasons therefore not sufficient for the requisite thread length, be more advantageous to leave the pressure part and the pin separate and to design said screw connection in such a manner that the pin is anchored in the borehole, preferably by means of a press- or taper-fit, and projects out of said borehole and is provided with the thread over a section of said part of the pin projecting out of the borehole, the distance between said section of said part of the pin projecting out of the borehole and the plane of the supporting surface being greater than the plate-thickness of the turnable cutting plate, said pin being, in the region between the supporting surface and said section provided with the thread, cylindrical and having a diameter being greater than or at least equal to the external diameter of the thread and that the pressure part is arranged at that side of a nut screwable onto the thread of the pin being turned toward the supporting surface and that a cylindrical borehole is provided within the pressure part, said borehole having the same diameter as that of the pin in the region between the supporting surface and the thread of the pin, the axis of said borehole coinciding with the axis of the threaded bore provided inside the nut. A particular advantage of this design for the screw connection is that, because of the fixedly arranged pin projecting out of the supporting surface, manipulation is simplified both when changing cutting edges and when inserting a new turnable cutting plate, as, when changing the cutting edge, the turnable cutting plate needs only, after slackening the nut, to be raised slightly and rotated about the pin, and when inserting a new turnable cutting plate said turnable cutting plate is simply pushed onto the pin with the opening and rotated into the correct position, so that, both when changing a cutting edge and when inserting a new turnable cutting plate, the somewhat difficult, because of the offset arrangement of the borehole, inserting of a screw is eliminated. In the present reamer the means for the adjusting and compression-proof supporting of the adjustable stop can advantageously comprise a pressure piece supported at at least one guide surface and arranged movably along the guide surface in a direction being parallel to the plane of the supporting surface and being inclined toward the said second polygon-side of the turnable cutting plate as well as in the opposite direction and resting on one side with a stop surface forming the adjustable stop against the said second polygon-side of the turnable cutting plate and on the other side with a contact surface against a set screw, and further comprise the set screw resting on one side on the pressure piece and on the other side on the said support element and a threaded borehole provided for the set screw in a part of the reamer head connected in one piece with the supporting surface, said set screw comprising a cylindrical part resting against said support element, a conical part coaxial with the cylindrical part, resting against the contact surface of the pressure piece, and a threaded neck, likewise coaxial with the cylindrical part, fitting into the threaded borehole provided for the set screw, the set screw as well as the contact surface of the pressure piece resting against the conical part of said set screw being arranged and designed in such a manner that the pressure piece is moved along the guide surface by rotation of said set screw. In this arrangement, the set screw and the turnable cutting plate can advantageously press the pressure piece against a base on which the pressure piece is movably arranged, holding means being preferably able to be provided to hold the pressure piece on the base during changing of a cutting edge on the turnable cutting plate and during changing of the turnable cutting plate itself, said holding means being preferably a springy pin fitted at the pressure piece and engaging in a sloping hole in the base. In the present reamer, the cutting edge and the spare cutting edges can advantageously each comprise a main cutting section in the region of the front end of the cutting edge and a secondary cutting section bordering on said main cutting section and extending to the rear end of the cutting edge, the grinding to shape of the turnable cutting plate to obtain the smallest possible removal of material and a correspondingly low grinding cost being preferably such that the secondary cutting sections of the turnable cutting plate extend parallel to the polygon-sides. Furthermore, the fixed stop should advantageously fix the position of the turnable cutting plate being pressed against said fixed stop in such a manner that the part of the cutting edge forming said secondary cutting section is inclined toward the axis of the reamer and that the distance between the axis of the reamer and the cutting edge is greater at the front end of the part of the cutting edge forming said secondary cutting section lying at the point of transition from the main cutting section to said secondary cutting section than at the rear end of the part of the cutting edge forming said secondary cutting section lying at the rear end of the cutting edge. The advantage of such an arrangement is that the secondary cutting section has the correct position and the same conicity at every setting of the adjusting means and that, in particular, re-adjustments to the reamer change nothing therein.

In order to prevent damage to the cutting edges, both the stops and all other parts of the reamer in contact with the turnable cutting plate should be designed, preferably by means of recesses, in such a manner that the cutting edge and the spare cutting edges do not come into contact with any other parts of the reamer. For the same reason it is also of advantage if in the region of its spare cutting edges the turnable cutting plate is surrounded in a frame-like manner by other parts of the reamer and these other parts extend above the plate-side of the turnable cutting plate facing away from the supporting surface or lie at least at the same height as said plate side of the turnable cutting plate, because damage to the spare cutting edges by foreign bodies is thereby essentially excluded. In the present reamer, the fixed stop should advantageously extend over a major part of the total length of said first polygon-side of the turnable cutting plate, preferably over more than 80% of the total length of said side. This results, firstly, in good guidance at the fixed stop when adjusting and re-adjusting the reamer, as well as in good fixing of the position of the secondary blade, and furthermore this is also of advantage in the interests of said prevention of damage to the spare cutting edges. Finally, in the present reamer, the offset of the borehole in the part carrying the supporting surface of the reamer head against the opening in the turnable cutting plate should advantageously be dimensioned in such a manner that in the middle of the adjusting range of the reamer the said springy force generated by the deflection of the pin acts at least approximately toward to the point at which the said first and said second polygon-sides of the turnable cutting plate or extensions thereof intersect. This has the advantage that an essentially even distribution of the springy force between the two stops takes place in the middle of the adjusting range of the reamer. This in turn is of particular advantage when the range provided for re-adjusting the reamer is somewhat smaller than the adjusting range, i.e. the maximally possible adjustment, because then, due to the positioning of the range provided for re-adjustment in the median section of the adjusting range, an approximately even distribution of the springy force between the two stops is maintained over the range provided for re-adjustment. But it is also of general advantage if the range provided for readjusting the reamer is smaller than the adjusting range of the reamer and lies within the median part of this adjustment range, because the restoring force exerted on the movable stop in the direction of the lower limit of the adjusting range, or in more precise terms, of adjustability, falls off too sharply and there is even a danger of minor, permanent deformation of the pin in the border area in the direction of the upper limit of the adjusting range, i.e. of adjustability.

By means of the following figures, the invention is in the following explained in more detail by reference to a few embodiments.

The figures show the following:

FIG. 1 an example of said preferred embodiment of the present reamer having a turnable cutting plate presenting essentially the form an equilateral triangle, shown in plan view, FIG. 2 a partial cross-section in the sectional plane I—I in FIG. 1 illustrating an embodiment of the adjusting means of the reamer shown in FIG. 1, FIG. 3 a cross-section in the sectional plane II—II in FIG. 1 illustrating the arrangement of the turnable cutting plate and its securing screw as well as of the threaded borehole for said securing screw of the reamer shown in FIG. 1, FIG. 4 a partial cross-section in the sectional plane III—III in FIG. 1 illustrating the embodiment of the fixed stop in relation to the turnable cutting-plate and particularly the recess and increased height at the upper edge of the stop provided for protecting the cutting edge in the reamer shown in FIG. 1, FIG. 5 a plan view of the turnable cutting plate of the reamer shown in FIG. 1 on an enlarged scale, FIG. 6 a cross-section in the sectional plane IV—IV in FIG. 5 illustrating the embodiment of the opening in the turnable cutting plate shown in FIG. 5 as well as the grinding-to-shape of the secondary cutting section, FIG. 7 a partial view of the turnable cutting plate shown in FIG. 5 illustrating the embodiment of the front part of the cutting edge comprising the main cutting section on an enlarged scale, FIG. 8 a drawing of the arrangement of the turnable cutting plate, fixed stop, adjustable stop and adjusting means as well as of guide surfaces provided therefor for an embodiment of the present reamer having a turnable cutting plate presenting essentially the form a square, FIG. 9 a drawing of the arrangement of the turnable cutting plate, fixed stop, adjustable stop and adjusting means as well as of guide surfaces provided therefor for an embodiment of the present reamer having a turnable cutting plate presenting essentially the form of an equilateral pentagon, FIG. 10 a drawing of the arrangement of the turnable cutting plate, fixed stop, adjustable stop and adjusting means as well as of guide surfaces provided therefor for an embodiment of the present reamer having a turnable cutting plate presenting essentially the form of an equilateral hexagon, FIG. 11 a drawing of the arrangement of the turnable cutting plate, fixed stop, adjustable stop and adjusting means as well as of guide surfaces provided therefore for an embodiment of the present reamer having a turnable cutting plate presenting essentially the form an equilateral octagon, FIG. 12 a drawing of the arrangement of the turnable cutting plate, fixed stop, adjustable stop and adjusting means as well as of guide surfaces provided therefor for an embodiment of the present reamer having a turnable cutting plate presenting essentially a rhombic form, FIG. 13 a schematic representation of the directions and relative magnitudes of the forces exerted by the deflected securing screw of the turnable cutting plate acting on said turnable cutting plate as well as on the stops in the center as well as at the lower and upper limits of the adjusting range in the reamer shown in FIG. 1.

Figures 1, 2, 3, 4, 5, 6, 7, 8, 9, 10, 11, 12, 13:
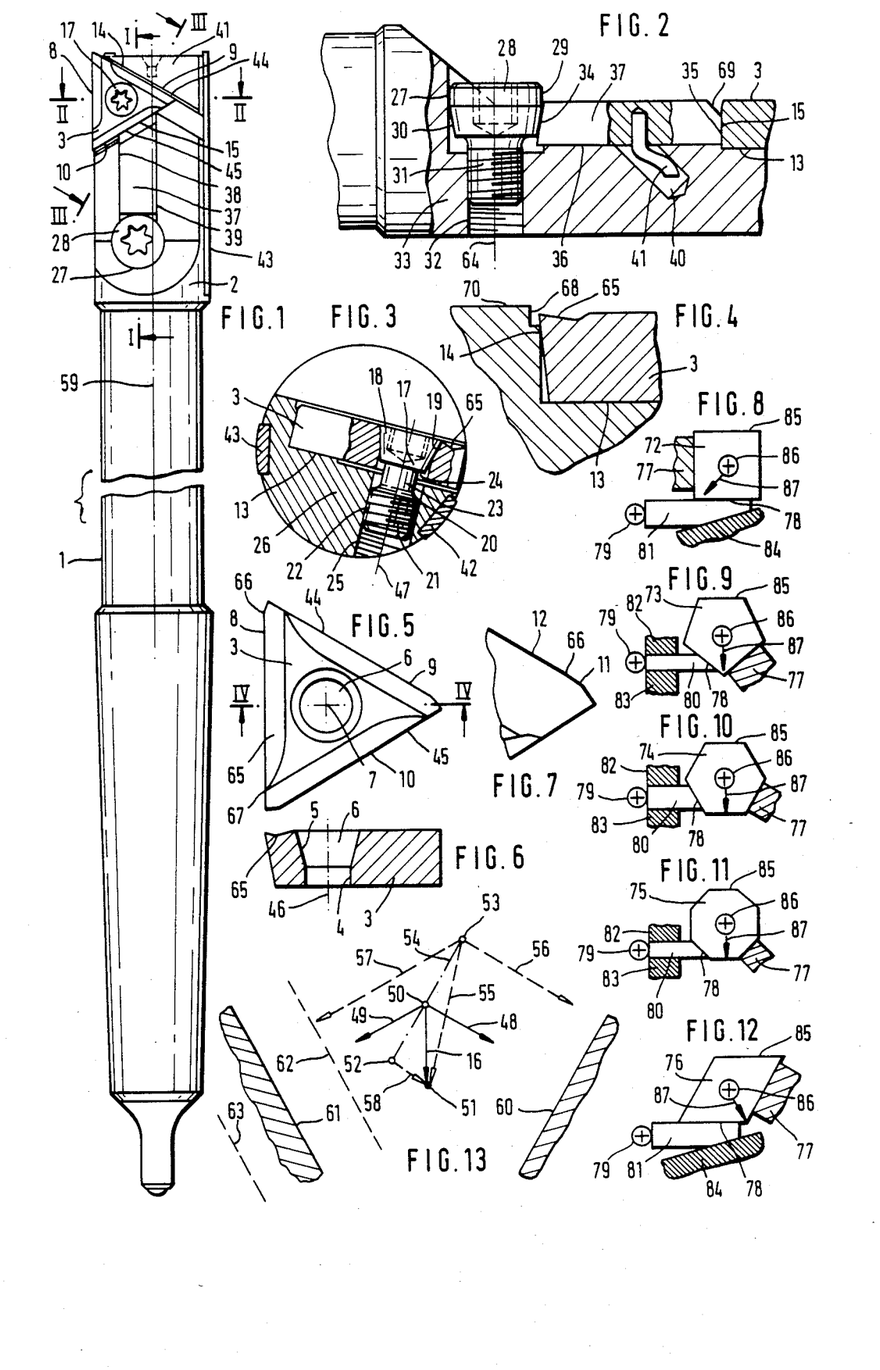

The example of the preferred embodiment of the present reamer shown in FIG. 1 consists of a reamer shank 1 having a reamer head 2 at its front end, a turnable cutting plate 3 having essentially the form of an equilateral triangle, said turnable cutting plate having an opening 6 possessing a cylindrical part 4 and a conically widening part 5, said opening being in the center of the plate 7 lying at the intersection of the bisecting lines of the internal angles of said triangle, as well as a cutting edge 8 and two spare cutting edges 9 and 10, each of which having a main cutting section 11 and a secondary cutting section 12 (see FIG. 7) screw 17 is provided for pressing the bottom of the turnable cutting plate 3 against a supporting surface 13 provided at the reamer head 2 (see FIGS. 3 and 4) as well as against a fixed stop 14 likewise provided at the reamer head 2 and against an adjustable stop 15 and furthermore provided to generate a springy force 16 (indicated in FIG. 13) for pressing the turnable cutting plate 3 against the two stops 14 and 15. The screw possesses a conical pressure part 19 provided at the head 18 of the screw and a pin 24 constituted by the shank 20 of the screw, provided over a section 21 of its length with a thread 22 and being for the remaining section 23 of its length of essentially reduced cylindrical shape. Threaded borehole 25 is engaged by screw 17, said borehole being located in a part 26 of the reamer head 2 carrying the supporting surface 13, and a set screw 28 is provided for adjusting the adjustable stop 15, while supported against a supporting shoulder 27 (best seen in FIG. 2) formed in one piece with the part 26 of the reamer head 2 carrying the supporting surface 13, said set screw having a cylindrical part 29 resting against the supporting shoulder 27, a conical part 30 serving for adjusting and a threaded neck 31 for engagement with a threaded borehole 32 located in a part 33 of the reamer head 2 and formed integrally with the supporting surface 13. A pressure piece 37 abuts on one of its side via a contact surface 34 against the conical part 30 of the set screw 28 and on the other side with a stop surface 35 forming the adjustable stop 15 for turnable cutting plate 3. Pressure piece 37 is arranged movably in a longitudinal direction on a base 36, guide edges 38 and 39 on the reamer head engaging the two longitudinal sides of the pressure piece 37 for guiding and supporting said pressure piece, a springy pin 41 depending from the underside of pressure piece 37, engaging in a sloping hole 40 in the base 36, for holding the pressure piece 37 on the base 36 during changing of the cutting edges and during changing of the turnable cutting plate. Guides 42 and 43 (FIGS. 1 and 3) serve to guide the cutting edge 8.

The springy force 16 generated by the screw 17, pressing the turnable cutting plate 3 against the fixed stop 14 along its triangle-side 44 carrying the spare cutting edge 9 and pressing said turnable cutting plate against the adjustable stop 15 along its side 45 of the triangle carrying the, spare cutting edge 10, in principle results from the facts that the axis 46 (see FIG. 6) of the opening 6 in the turnable cutting plate 3 is slightly offset from the axis 47 (see FIG. 3) of the threaded borehole 25 provided for the screw 17 in the the part 26 of the reamer head 2 carrying the supporting surface 13 and that during tightening of the screw 17 the reduced cylindrical part 23 of said screw is elastically slightly deflected so that through this deflection of the screw 17 the displacement of the opening 6 against the threaded borehole is compensated for. As a result of this deflection, the conical pressure part 19 provided at the head 18 of the screw 17 lies only unilaterally at the conically widening part 5 of the opening 6 in the turnable cutting plate and presses against the turnable cutting plate 3 with the springy force 16 caused by the deflection. This springy force acts in the direction from the axis 46 of the opening 6 toward the axis 47 of the threaded borehole 25, and hence against the turnable cutting plate 3 which as a result in turn presses against the two stops 14 and 15. The force components 48 and 49 (see FIG. 13) of the springy force 16 should advantageously be of approximately equal magnitude in the middle of the adjusting range of the reamer. This is the case when a straight line starting at the intersection of the triangle-sides 44 and 45 of the turnable cutting plate carrying the spare cutting edges 9 and 10 and leading toward the axis 46 of the opening 6 intersects the axis 47 of the threaded borehole. This is shown schematically in FIG. 13. The point 50 represents the position of the axis 46 of the opening 6 in the middle of the adjusting range, the point 51 the fixed position of the axis 47 of the threaded borehole 25, the points 52 and 53 the position of the axis 46 of the opening 6 at the lower and upper limits, respectively, of the adjusting range, the dash-and-dot line 54 the path along which the axis 46 of the opening 6 or the point represented by said axis when adjusting from one limit of the adjusting range to the other is displaced, the arrow 16 the springy force 16 in the center of the adjusting range caused by the deflection of the screw 17 and the arrows 48 and 49 the force components 48 and 49 of said springy force 16 acting on the stops 14 and 15 respectively, the dashed arrow 55 the springy force 55 at the upper limit of the adjusting range caused by the deflection of the screw 17 and the dashed arrows 56 and 57 the force components of said springy force 55 acting on the stops 14 and 15 respectively, and, finally, the dashed arrow 58 the springy force 58, caused by the deflection of the screw 17, acting only on the fixed stop 14 and having no force components acting on the adjustable stop 15, at the lower limit of the adjusting range. As can be seen from the relative magnitudes shown in FIG. 13, the distance between the axis 46 of the opening 6 and the axis 47 of the threaded borehole 2, and hence also the deflection of the screw 17 and approximately also the springy force caused by this deflection is half as great at the lower limit of the adjusting range and 1.8 times as great at the upper limit of the adjusting range as in the middle of the adjusting range. The force component of the springy force (arrows 58, 48 and 56) acting on the fixed stop 14 is half as great at the lower limit of the adjusting range, just as great in the middle of said adjusting range, and one-and-one-half times as great at the upper limit of said adjusting range, as the springy force 16 in the middle of the adjusting range caused by the bending of the screw 17, and the force component of the springy force (arrows 49 and 57) acting on the adjustable stop 15, and hence the restoring force acting on the adjustable stop 15, is zero at the lower limit of the adjusting range, just as great in the middle of said adjusting range, and twice as great at the upper limit of said adjusting range as the springy force 16 in the middle of the adjusting range caused by the bending of the screw 17. By meeting the above-stated prerequisite that the force components 48 and 49 of the springy force 16 be of equal magnitude in the middle of the adjusting range of the reamer, the advantage is therefore obtained that the restoring force acting on the adjustable stop 15 rises in virtually linear fashion over the adjusting range from zero at the lower limit of said adjusting range up to the upper limit of said adjusting range as adjustment is effected. In dimensioning the distance between the axis 46 of the opening 6 and the axis 47 of the threaded borehole 25 at the lower limit of the adjusting range (distance between points 51 and 52 in FIG. 13), it should be noted that the distance between the axes 46 and 47 at the upper limit of the adjusting range (distance between points 51 and 53 in FIG. 13) is approximately 3.6 times the distance between the axes 46 and 47 at the lower limit of said adjusting range and that the adjustability of the distance between the cutting edge 8 and the axis 59 of the reamer from the lower up to the upper limit of said adjusting range is 3 times the distance between the axes 46 and 47 at the lower limit of the adjusting range. If, therefore, for example, the maximum permissible deflection of the screw 17 within its elastic range lies at 100 microns and it is desired to exploit the adjusting range up to its upper limit then the distance between the axes 46 and 47 at the lower limit of the adjusting range (distance between points 51 and 52 in FIG. 13) and hence also the basic offset of the threaded borehole 25 from the opening 6 amount advantageously to at the most one quarter of the maximum permissible deflection, i.e. maximum 25 microns, to which must, however, be added the amount of spare travel caused by the "wobble" of the screw 17 in the threaded borehole 25 (which can be determined experimentally) by which the head 18 of the screw or the conical pressure part 19 is able to move out of its center position until the onset of deflection by the screw 17. A basic offset of 25 microns would, according to the preceding remarks, yield an adjustability of the cutting edge 8 of 75 microns, which, is in any event higher than required for re-adjusting a reamer. The range of, e.g., 10 through 20 microns required for re-adjusting can therefore preferably be placed in the central part of the adjusting range and it can furthermore be advantageously arranged that the adjustability of the adjustable stop 15 is limited at the upper limit of the re-adjusting range and that thereby the deflection of the screw 17 remains considerably below its maximum permissible value and that furthermore the tolerance requirements for said basic offset of the threaded borehole 25 against the opening 6 do not need to be set too high either. It remains to be pointed out in regard to FIG. 13 that in the present form it is only applicable to the embodiment of the present reamer as represented in FIG. 1 and that the two hatched lines 60 and 61 are only intended to indicate the angular position of the two stops 14 and 15, that, however, the stops 14 and 15 would have to lie approximately 2.5 m away from the point 50 in the correct size ratio to the depicted distances between the axes 46 and 47 of the opening 6 and the threaded borehole 25. Consequently, the movability of the adjustable stop indicated by the dashed lines 62 and 63 should be thought of as being, in terms of correct size ratios, approx. 2.5 m away from the point 50.

The mode of action of the adjusting mechanism in the reamer depicted in FIG. 1 and correspondingly also in the embodiments of the present reamer represented schematically in FIGS. 8 through 12 can be seen in FIG. 2. By rotating the set screw 28, the pressure piece 37 is moved by 2.778 $\mu m \times tg\alpha \times $ pitch/mm per degree of rotation, where $\alpha$ is the angle of inclination of the conical part 30 of the set screw 28 to the axis 64 of said set screw and the pitch is that of the thread arranged on the threaded neck 31 of the set screw 28, with a pitch of 1 mm and angle of inclination $\alpha$ of 10° as in the case of the reamer shown in FIG. 1, i.e. by approx. 0.5 $\mu m$ per degree of rotation of the set screw 28. In FIG. 2, the displacement of the pressure piece 37 during the tightening of the set screw 28 takes place toward the right, against the said restoring force (arrows 49 and 57 in FIG. 13) caused by the deflection of the screw 17, and during slackening of the set screw 28 toward the left as a result of said restoring force. As can be seen from FIG. 1, the displacement of the pressure piece 37 taking place in the direction of the axis 59 of the reamer brings about a displacement of the turnable cutting plate 3 along the fixed stop 14, the distance between the cutting edge 8 and the axis 59 of the reamer increasing during tightening of the set screw 28 and reducing during slackening of said set screw, and the alteration of this distance amounting to 0.866 times the displacement of the pressure piece 37, so that in the said example, therefore, a pitch of 1 mm and angle of inclination $\alpha$ of 10° produces a displacement of the cutting edge 8 of 0.424 $\mu m$ per degree of rotation of the set screw 28. The adjustable stop 15 formed by the stop surface 35 of the pressure piece 37 is supported at the support element 27 formed by one surface of the basic body of the reamer via the pressure piece 37 and its contact surface 34 as well as via the conical part 30 and the cylindrical part 29 of the set screw 28. The restoring force acting on the adjustable stop 15 is transferred mainly to the support element 27 and to only a slight extent by way of the threaded neck 31 of the set screw 28 to the threaded borehole 32; this is important for the reason that the set screw 28 would otherwise no longer be easy to move and the transfer of too large a proportion of the restoring force through the threaded neck 31 to the threaded borehole 32 would cause the set screw 28 to move stiffly. The pressure piece 37 is secured against any cross-displacement by means of the guide surfaces 38 and 39. As a result of the slanting position of the contact surface 34 and the stop surface 35, when the turnable cutting plate 3 is clamped in position the pressure piece 37 is pressed firmly against the base 36 and held firmly against said base by, on the one hand, the turnable cutting plate 3 and, on the other hand, by the set screw screw 28. To ensure that the pressure piece 37 also continues to be held in place on the base 36 during changing of cutting edges and changing of the turnable cutting plate 3, when the restoring force exerted on the pressure piece 37 by the turnable cutting plate 3 is removed, the pressure piece 37 is provided with the springy pin 41 engaging in the sloping hole 40.

When using turnable cutting plates in the form of an equilateral triangle as in the case of the reamer shown in FIG. 1, the arrangement of the threaded borehole required for the screw 17 is somewhat problematic, since, if the turnable cutting plate is arranged in the customary manner such that a radius vector directed at the cutting edge from the axis of the reamer meets the plane of the plate-side of the turnable cutting plate carrying the cutting edge, there would not be enough space available for this threaded borehole or, put more precisely, the length available for said threaded borehole would be too small to be able to accommodate the loads arising during the bending of the screw 17; furthermore, said threaded borehole would in this case also touch the guides (42 in FIG. 3) arranged behind the cutting edge, thereby reducing still further the length available for said threaded borehole. The solution to this problem in the reamer shown in FIG. 1 is illustrated in the section through the reamer head 2 in the sectional plane II—II in FIG. 3. As can be seen from said FIG. 3, the turnable cutting plate 3 in the reamer in FIG. 1 is arranged inclined toward a radius vector directed from the axis 59 of the reamer toward the cutting edge 8 in such a manner that the threaded borehole 25 does not strike the guide 42 but continues past said guide and in that its length is approximately twice as long as the length which would be available with the afore-mentioned customary arrangement of the turnable cutting plate. This inclined arrangement of the turnable cutting plate 3, however, requires a particular grinding-to-shape 65 of the cutting edge 8, and naturally of the spare cutting edges 9 and 10 also, by which the inclination of the turnable cutting plate 3 is compensated for and which for this reason requires the removal of a larger amount of material during grinding-to-shape as would be the case with the said customary arrangement of the turnable cutting plate. If this somewhat more expensive grinding-to-shape is to be avoided it is advantageous to replace the screw 17 with the threaded borehole 25 by a threaded pin with a nut, said pin being anchored by a press- or taper-fit in a smooth borehole provided in replacement of the threaded borehole 25 and projecting out of the supporting surface 13, the end piece of said projecting part being provided with a thread, and the nut screwed onto the thread being provided with a conical pressure part according to the pressure part 19 of the screw 17, for with such a design the length of the smooth borehole taking the place of the threaded borehole 25 can without difficulty be made considerably smaller than the length required for the threaded borehole 25, and this in turn permits an arrangement of the turnable cutting plate in the above-mentioned customary manner in such a manner that a radius vector directed from the axis of the reamer toward the cutting edge enters the plane of the plate-side of the turnable cutting plate carrying the cutting edge, thus obviating the need of special grinding-to-shape to compensate for an inclined arrangement of the turnable cutting plate. The length of the smooth borehole taking the place of the threaded borehole 25 can be considerably less than the length required for the threaded borehole 25 because, firstly, with the same length and the same external diameter, the bending load bearing capacity of a pin clamped in a smooth borehole is considerably greater than that of a threaded pin screwed into a threaded borehole, and, secondly, as can be seen in FIG. 3, a part of the total length of the threaded borehole 25 is required for the cylindrical part 23 of the screw 17 provided for the deflection of said screw. In addition to eliminating the need for a special grinding-to-shape, the design with a threaded pin and nut instead of the screw 17 and the threaded borehole 25 furthermore has the advantages, already mentioned above, of simplified manipulation when changing cutting edges and when inserting a new turnable cutting plate, though it must be accepted that the nut projects over the plate-side of the turnable cutting plate carrying the cutting edge (whereas, as can be seen in FIG. 3, this is not the case with the screw 17) and that instead of a single part, i.e. the screw 17, two separate parts are required with the threaded pin and the nut.

FIGS. 5 through 7 show how the turnable cutting plate 3 for the reamer as shown in FIG. 1 is designed in detail. In general, a commercially available turnable cutting plate of suitable size is employed for the turnable cutting plate 3 which is already provided with the opening 6 and in the unprocessed form possesses exactly the shape of an equilateral triangle, and this turnable cutting plate is ground to the shape required for its intended purpose in a reamer. As a rule, the cutting edges of reamers possess at their front end a so-called main cutting section which is intended for cutting away roughness in the borehole to reamed, along which said main cutting section the distance from the axis of the reamer increases toward the rear end of the cutting edge, and a so-called secondary cutting section bordering on the rear end of the main cutting section, along which secondary cutting section the distance from the axis of the reamer gradually diminishes toward the rear end of the cutting edge. The distance between the cutting edge and the axis of the reamer is therefore greatest at the point of transition from the main cutting section to the secondary cutting section and hence diminishes—since the secondary cutting section extends over the largest part of the total length of the cutting edge—over almost the entire length of the cutting edge toward the rear end of the cutting edge. Accordingly, when grinding the cutting edge of a reamer to shape, material would have to be ground off the unprocessed body of the cutting edge over almost the entire length of said cutting edge in order to grind the secondary cutting section inclined toward the axis of the reamer out of the body of the cutting edge. To avoid, in the present reamer, the cost and effort associated therewith, the inclination of the stop bar forming the fixed stop 14 to the axis of the reamer was selected in such a manner that the triangle-side of an unprocessed turnable cutting plate having the triangle-side 44 provided for the spare cutting edge 9 resting against the stop bar forming the fixed stop 14 already has the angle to the axis of the reamer required for the secondary cutting section 12 and therefore the above-mentioned grinding of the secondary cutting section out of the body of the cutting edge can be eliminated. The same also, of course, applies correspondingly to the fixed stop in the embodiments of the present reamer shown in the FIGS. 8 through 12. Apart from a fine grinding operation to increase the sharpness of the edge and the said grinding-to-shape 65 to compensate for the inclined arrangement of the turnable cutting plate, the secondary cutting sections 12 of the turnable cutting plate 3 are, therefore, essentially formed by the edges of the cutting edges of the unprocessed turnable cutting plate and either coincide with said edges or at least run parallel to said edges and hence to the triangle-sides of the turnable cutting plate, and the grinding-to-shape required for producing the turnable cutting plate 3 out of an unprocessed turnable cutting plate essentially extends only to the front part of the cutting edge 8 and the spare cutting edges 9 and 10 comprising the main cutting section 11 as well as the said grinding-to-shape 65 required for compensating for the inclined arrangement of the turnable cutting plate, whereas in the area from the point of transition 66 from the main cutting section 11 to the secondary cutting section 12 up to the rear end of the cutting edge 67 (apart from the said fine grinding to increase the edge sharpness, which, incidentally, is not absolutely necessary) cutting-to-shape can be dispensed with. How the front part of the cutting edge 8 and of the spare cutting edges 9 and 10 are ground to shape in detail is shown in the enlarged representation of a corner of the turnable cutting plate 3 shown in FIG. 5 presented in FIG. 7.

In order to ensure that the cutting edges and spare cutting edges of the turnable cutting plate 3 are protected against damage, the fixed stop 14 is, as can be seen in FIG. 4, provided with the recess 68 at its upper end and the pressure piece 37 is, as can be seen in FIG. 2, provided with the bevel 69 at the upper end of its stop surface 35 forming the adjustable stop 15. and furthermore the turnable cutting plate 3 is arranged in a recessed position with respect to the parts surrounding it, i.e. the part 70 at the head end 71 of the reamer head 2 carrying the fixed stop 14, the pressure piece 37 and the parts carrying the guide surfaces 38 and 39 for the pressure piece 37, which is brought out particularly clearly in FIGS. 3 and 4.

In order to limit the adjustability of the adjustable stop 15 and the set screw 28 in the direction effecting an increase in the distance between the set screw 28 and the reamer axis 59 such that the deflection of the screw 17 or rather of the cylindrical part 24 of said screw still lies within the elastic deflecting range of the screw 17 or rather of the cylindrical part 24 of said screw at the upper limit of the adjusting range of the reamer, it should be further pointed out that this limitation may be effected not only by means of limiting means provided therefor but also by means of suitable operating regulations for the reamers, e.g. in the form of a regulation for the maximum permissible readjustment. In the reamer shown in FIG. 1 limiting means are, however, shown, whereby the set screw 28 can only be tightened until its threaded neck is screwed completely into the theaded borehole 32. In the position shown in FIG. 2, for example, the set screw 28 can only be tightened by approx. a further 120°, which would correspond to a re-adjustment of the reamer of approx. 50 μm and an approximately equally large increase in the deflection of the screw 17. Another possible limiting means would be, for example, a stop for the screw 28 which, e.g., could consist of a short threaded pin screwed into the threaded borehole 32 in FIG. 2 from below, said threaded pin being anchored in position by a metal adhesive hardening after the adjustment had been carried out.

FIGS. 8 through 12 show schematically how the fixed stop 77 and the adjustable stop 78 as well as the adjusting means, i.e. the set screw 79, the pressure piece 80 or 81 and the guide surfaces 82 and 83 or 84 should be advantageously designed and arranged with respect to the cutting edge 85 in the case of other commercially available turnable cutting plate such as the square turnable cutting plate 72 in FIG. 8, the turnable cutting plate 73, having the form of an equilateral pentagon, in FIG. 9, the turnable cutting plate 74, having the form of an equilateral hexagon, in FIG. 10, the turnable cutting plate 75, having the form of an equilateral octagon, in FIG. 11, and the rhombic turnable cutting plate 76 in FIG. 12. The adjusting mechanism shown in FIG. 2 can, as FIGS. 8 through 12 show, in principle be used with all embodiments of the present reamers shown in FIGS. 8 through 12, in the embodiments depicted in FIGS. 9 through 11 even with the same arrangement of the guide surfaces 38, 39 and 82, 83 provided for the pressure piece 37 or 80, and in the embodiments in FIGS. 8 and 12 with a slightly modified pressure piece 81 a differently arranged guide surface 84. At the middle of the adjusting range, the springy force 87 caused by the screw 86 provided as fixing means for the turnable cutting plate as a result of its deflection should advantageously act in approximately the direction shown in FIGS. 8 through 12. It should be further pointed out that the embodiments shown in FIGS. 8 through 12 can be arranged on the reamer head 2 for the various commercially available turnable cutting plates in the same manner as shown in FIG. 1 for the embodiment having a turnable cutting plate having the form of an equilateral triangle. Finally, it remains to be noted that the embodiments shown in FIGS. 8 through 11 are first and foremost suitable for reaming through-holes, whereas the embnodiment shown in FIG. 12 is in addition suitable for reaming boreholes which end in the material right down to the bottom of the bore. To permit the embodiment according to FIG. 12 to be provided with cutting edges on all four rhombus-sides of the turnable cutting plate 76, two parallel cutting edges have to be arranged on both plate sides of the turnable cutting plate 76.

In conclusion, it should be further noted that in connection with the present invention the term "reamer head" should be understood in its general meaning, that, for example, in the case of a stepped tool each individual step of said stepped tool should, within the meaning of the present invention, be considered as a "head" of the tool and hence as a stepped tool in which one or even several of the steps are designed as a reamer head in accordance with the present invention, and in addition to designating a tool for the functions of the other steps, also represents a re-adjustable machine reamer according to the present invention. The term "reamer head" within the meaning of the present invention is accordingly to be understood to mean that the element performing the reaming function, designated the reamer head, is normally arranged in the area of the front end of the tool or of the tool shank but may equally well be arranged at some other part of the tool or tool shank. For example, the "reamer head" on a reamer which is provided for the said reaming of through-holes and in which the tool shank is designed in the manner of a drilling rod may be arranged in the central area of this tool shank designed in the manner of a drilling rod, just as the "reamer head" constituting, for example, the second or third step on a stepped tool is arranged displaced to the rear with respect to the front end of the stepped tool.

Within the context of the present invention the part of the reamer head comprising the turnable cutting plate as well as the fastening and adjusting means of said turnable cutting plate and the supporting surface provided for said turnable cutting plate may further be designed as an assembly set being detachable from the other parts of the reamer head or tool, and hence, being exchangable, in the manner known, e.g., from so-called short clamp holders (Kurzklemmhalter). The advantages resulting therefrom are the same as for the known said short clamp holders, i.e. standard design of the assembly set for a series of different types and diameters of reamers, including stepped tools possessing one or more steps having the function of a reamer.

I claim:

1. An adjustable machine reamer comprising a tool shank and a reamer head having a supporting surface thereon; a removable cutting plate having at least one cutting edge and two generally opposed side edges, said side edges extending in diverging relation to each other and obliquely to the reamer axis, said plate being disposed on said supporting surface for sliding movement parallel to such surface to move said cutting edge generally radially of the reamer axis; a fixed elongated abutment on said head supporting surface extending parallel to one of said plate edges; a movable elongated abutment member with the abutment thereof extending parallel to the other of said edges being mounted on said supporting surface for movement generally toward and away from said fixed member to vary the separation between the fixed and movable abutments and thereby adjust the radial position of the cutting plate on said supporting surface; cam means engaging said movable abutment member, said cam means being operative (a) in one direction to apply positive force to said movable abutment member and thereby move the same toward said fixed abutment and thus positively adjust the position of said cutter plate radially outwardly on said reamer head surface and (b) in the opposite direction to remove said positive force from said movable member; and plate anchoring means for clampingly retaining said cutting plate on said surface while the same undergoes such positional adjustment and resiliently deflecting in response to the positive outward adjustment of said cutting plate, whereby upon removal of at least part of said positive force by movement of said cam means in said opposite direction, said anchoring means undergoes a corresponding at least partial restoration of its undeflected position to thereby move said plate edge radially inwardly.

2. A reamer according to claim 1, characterized in that the cutting plate (3) is in the form of a polygon, carrying at least two cutting edges along its sides, and is turnably supported on said head supporting surface to permit a new cutting edge to be brought into the cutting position.

3. The reamer of claim 1, wherein said plate anchoring means comprises an opening passing through said cutting plate generally perpendicular to the plane thereof, said opening including a conical shaped section along its length, and a threaded pin penetrating said opening and having a threaded end engaged in a threaded bore in said reamer head, said pin having a conical shaped section adapted to seat in the conical shaped section of said opening and apply clamping pressure to said plate, and the axes of said opening and said threaded bore diverging from one another at an angle such that when said pin is threaded in said bore to seat its conical shaped section in the conical shaped section of said opening, said pin deflects in response to the application thereto of said position force by said cam means via said movable abutment member.

4. A reamer according to claim 2, characterized in that all such cutting edges lie on the face of the turnable cutting plate remote from the supporting surface.

5. A reamer according to claim 2, wherein said tool shank is at one end of said reamer and said head is at the other end thereof and said first cutting plate side and the fixed abutment associated therewith is disposed closer to the head end of the reamer head (2) than said second side and the adjustable abutment associated therewith.

6. A reamer according to claim 2, wherein at least one of said cutting edges lies on the face of the plate remote from said supporting surface and at least one other of said cutting edges lies on the opposite face of the plate and the opening in the turnable cutting plate comprises, in addition to a conical section widening toward the remote face of said cutting plate supporting surface, a further conical section widening toward the opposite face of the plate, whereby said plate can be clamped in inverted position on said surface.

7. A reamer according to claim 6, wherein the conicity of said two conical sections is identical, the axes of said two conical sections coincide and extend through the center of the plate and intersect the planes of its two faces perpendicularly and said plate anchoring means comprises a pin having a generally conical shaped section of at least approximately the same conicity as that of the two conical sections of the opening.

8. A reamer according to claim 3, characterized in that the threaded part (21) of the pin is completely accommodated within the threaded borehole (25).

9. A reamer according to claim 8, wherein said pin has a non-threaded section intermediate its threaded end and said conical section over at least a part of total length of said non-threaded section, the diameter of said non-threaded section being at most equal to the external diameter of the threaded end reduced by twice the depth of the thread.

10. A reamer according to claim 1, wherein said adjustable abutment is provided at one end of a pressure piece (37; 80, 81) which is supported by at least one guide surface (38, 39; 82, 83, 84) for movement therealong in a direction parallel to the plane of the supporting surface (13) and inclined with respect to the other of said opposed plate edges, said pressure piece having a contact surface at its other end for engagement by a set screw, said screw being threaded in a borehole (32) provided therefor in the reamer head having said supporting surface (13) comprising a conical section (3) adapted for sliding contact with the contact surface of the pressure piece, whereby the pressure piece is advanced along the guide surface by rotation of said set screw in said borehole.

11. The reamer of claim 10, wherein said set screw includes a cylindrical section coaxial with said conical section and said head carries a fixed shoulder for engagement with the periphery of said cylindrical section in the opposite side from the contact surface of said pressure piece to support said set screw against bending.

12. A reamer according to claim 11, wherein said plate carries a plurality of cutting edges and is turnably supported on said supporting surface, the set screw (28; 79) and the cutting plate press the pressure piece (37; 80, 81) against a base (36) formed on said head on which the pressure piece is movably arranged, and means (40, 41) are provided to hold the pressure piece on the base during turning of the plate from one edge to another.

13. The reamer of claim 12, wherein said holding means is a springy pin (41) dependent from the pressure piece and engaging in a sloping hole (40) in the base (36).

14. A reamer according to claim 1, wherein each such cutting edge comprises a mian cutting section (11) in the region of its front end of the cutting edge and a secondary cutting section (12) adjacent said main cutting section and extending to the rear end of the cutting edge.

15. A reamer according to claim 14, characterized in that the secondary cutting section of each edge is inclined toward the axis (59) of the reamer, the distance between the axis of the reamer and the front end of said secondary cutting section is greater than at the rear end of said secondary cutting section.

16. A reamer according to claim 1, where the fixed abutment extends over at least a major part of the toal length of said first side of the cutting plate.

17. A reamer according to claim 3, wherein the angle of divergence between the axes of the borehole (25) and the opening in the cutting plate is such that in the middle of the adjusting range of the reamer the resilient force (16) generated by the deflection of the pin acts at least approximately toward the point at which said first and said second sides of the cutting plate intersect.

* * * * *